(12) United States Patent
Lindsay et al.

(10) Patent No.: US 7,287,043 B2
(45) Date of Patent: Oct. 23, 2007

(54) SYSTEM AND METHOD FOR ASYNCHRONOUS DATA REPLICATION WITHOUT PERSISTENCE FOR DISTRIBUTED COMPUTING

(75) Inventors: Bruce G. Lindsay, San Jose, CA (US); Inderpal S. Narang, Saratoga, CA (US); Vijayshankar Raman, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 491 days.

(21) Appl. No.: 10/645,221

(22) Filed: Aug. 21, 2003

(65) Prior Publication Data

US 2005/0044088 A1 Feb. 24, 2005

(51) Int. Cl.
G06F 7/00 (2006.01)
G06F 17/30 (2006.01)

(52) U.S. Cl. .................... 707/200; 707/100; 707/10
(58) Field of Classification Search ................ 707/100, 707/200

See application file for complete search history.

(56) References Cited

U.S. PATENT DOCUMENTS

| | | | |
|---|---|---|---|
| 5,212,772 A | 5/1993 | Masters | |
| 5,506,962 A | 4/1996 | Orimo et al. | |
| 5,737,738 A | 4/1998 | Sharman | |
| 6,006,267 A * | 12/1999 | Nguyen et al. | 709/227 |
| 6,138,124 A | 10/2000 | Bechardt | |
| 6,253,211 B1 | 6/2001 | Gillies et al. | |
| 6,335,937 B1 | 1/2002 | Chao et al. | |
| 6,338,092 B1 | 1/2002 | Chao et al. | |
| 6,763,352 B2 * | 7/2004 | Cochrane et al. | 707/4 |
| 6,889,231 B1 * | 5/2005 | Souder et al. | 707/104.1 |
| 2001/0037398 A1 | 11/2001 | Chao et al. | |
| 2001/0055274 A1 | 12/2001 | Hegge et al. | |
| 2002/0152362 A1 | 10/2002 | Cochran | |
| 2003/0088589 A1 * | 5/2003 | Good et al. | 707/203 |

* cited by examiner

Primary Examiner—John Cottingham
Assistant Examiner—Kimberly Lovel
(74) Attorney, Agent, or Firm—Gibb & Rahman, LLC

(57) ABSTRACT

A system and method of lightweight asynchronous data replication that avoids the need for any persistent store at the replication source or communication channel, and is independent of the underlying data formats, wherein the method of data replication comprises replicating deltas from a source, embedding replication tracking information in the replicated deltas, wherein the tracking information comprises a timestamp and a sequence number, and applying deltas at a target. The tracking information is used to ensure that each delta is applied exactly once. In the event of a crash in the system, the target analyzes the tracking information to determine which deltas have been applied, and requests retransmission of replicated data from the source starting from the earliest unapplied delta. The source and target are treated as only delta producers and consumers, and as such the invention is applicable to replication between arbitrary data source formats.

52 Claims, 7 Drawing Sheets

SYSTEM AND METHOD FOR ASYNCHRONOUS DATA REPLICATION WITHOUT PERSISTENCE FOR DISTRIBUTED COMPUTING

BACKGROUND OF THE INVENTION

1. Field of the Invention

The present invention generally relates to data replication and more particularly to a method and system for lightweight asynchronous data replication that avoids the need for any persistent storage at the replication source as well as any persistent communication channels, and which is independent of the format of the underlying data sources.

2. Description of the Related Art

Enterprise applications increasingly access operational data from a variety of distributed data sources. Data replication involves duplicating such operational data at multiple locations. Replication is used for two reasons. First, it provides higher availability and disaster recovery because applications can be transferred to the replica nodes if the master node is unavailable. Second, it provides better performance and scalability. By maintaining multiple copies at distributed sites, applications can access their data locally, without going over a network and without burdening any single server machine.

The main task in replication is to update data copies located in multiple locations as the original data changes. This is done by continually sending change records (deltas or δs) to the replica locations. It is possible to keep the source and target databases synchronized with each other using a 2-phase commit update protocol. However this imposes a substantial burden on the replication source because every transaction needs to wait until updates are received at and acknowledged by all replica locations. So the typical replication pattern is to decouple the updates at the replication source from the distribution of the deltas.

There are two traditional methods used for such asynchronous replication. The first method, shown in FIG. 1, is to use a persistent change table at the replication source. A capture program running at the replication source continually scans the change log for new changes, and inserts them into the persistent change table as complete transactions. Concurrently, an apply program reads the change table and applies these transactions to the target database sites. The main drawbacks with this approach are reduced data throughput and reduced scalability. First, all changes must be inserted into the persistent change table, and then removed from it to be applied to the targets. This reduces the throughput of replications. Second, a single change table at the source must supply requests from all the replication targets. Thus, this approach does not scale well to large numbers of replication targets.

To avoid this scalability problem, another replication solution uses persistent queues in the communication channel between source and target as shown in FIG. 2. Changes read from the data log are directly entered into a persistent queue, and are picked up from the queue at the target site by the apply program. This solution also suffers from low throughput because of the inserts and deletes into the persistent queue. In addition, the apply program needs to atomically do two operations: delete a change from the persistent queue, and apply the change to the target database. This atomicity is typically obtained through a two-phase commit protocol, causing further loss in throughput.

Besides the scalability and throughput problems, the above two solutions are also quite "heavyweight" because of the need for persistence at the source or in the queue. This persistence is typically obtained through the use of relational database management systems (DBMSs). But increasingly distributed computing applications use a mix of data formats, including files, relational databases, document management systems, etc. Therefore, there is a need for asynchronous data replication that avoids the requirement for persistence at the source and the communication channel, and which can handle a wider variety of data formats rather than just relational databases.

SUMMARY OF THE INVENTION

The invention provides a method of data replication in a distributed computing system, wherein the method comprises assigning a delta production/consumption value for arbitrary data sources and targets operable for replicating data. Next, the process involves embedding replication tracking information within the data, wherein the replication tracking information comprises a timestamp and a contiguous sequence number. Thereafter, the method includes atomically and independently applying updates at a target site using the replication tracking information. The next step of the process provides using a capture service at a source site for flow control, wherein the capture service comprises a buffer. Upon completion of this step, the process then involves using an apply service at the target site to embed and analyze the tracking information during a crash recovery sequence. Finally, the process includes using a monitor service to maintain a state of ongoing replications for status and quality-of-service tracking.

The method further comprises allowing data sources and targets of arbitrary data formats, including relational DBMSs, files, query results, XML DBMSs to be replicated, through an abstraction of delta (change) production/consumption, and a monotonically increasing timestamp on each delta (δ). The replication tracking information is used to determine if a given delta (δ) has been previously applied to the target site. Moreover, in the event of a crash in the system, the target site requests retransmission of replicated data from the source site beginning at a given timestamp and sequence number. The sequence number and timestamp are operable to determine if any transaction has been lost during transmission from the source site to the target site, wherein the sequence number is a contiguous series of numbers increasing from 1 to n and the timestamp is any monotonically increasing sequence of numbers.

Furthermore, according to the method of the invention, the target site is operable to apply deltas (δ) autonomously and independently from the source site. Also, the capture and apply services, respectively, send periodic signals to the monitor service to track a progression of replication for answering status and quality of service queries. The capture service selectively removes replication requests, which lag other requests by more than a predetermined permissible amount. Additionally, the replicated data further comprises origination tags, wherein the origination tags are operable to prevent duplicate replications of a same data from occurring at the target site via different routes.

Moreover, the apply service utilizes run-length encoding to compactly describe an interval of timestamps and sequence numbers, wherein the apply service utilizes an in-memory index when a system crash occurs and a recovery process is initiated by the system. The target site autonomously tracks a progression of replication of the data by maintaining a separate table of applied deltas (δ), wherein the separate table comprises an entry, wherein each entry in the table comprises the timestamp and the sequence number of a delta (δ), wherein the sequence number is operable to determine if a transaction has been misplaced in the system. A file-based target site can maintain the table in a separate file and perform atomic updates by writing the file to a disk before updated files are written to the disk.

Additionally, the invention provides a program storage device readable by computer, tangibly embodying a program of instructions executable by the computer to perform a method of data replication in a distributed computing system as described above. Moreover, the invention provides a data replication system comprising a source site containing data to be replicated, wherein the data is embedded with replication tracking information, wherein the replication tracking information comprises a timestamp and a contiguous sequence number; a target site connected by a communication channel to the source site, wherein the target site is operable to receive updates using the replication tracking information; a delta production/consumption interface in communication with arbitrary data sources and targets; wherein the source site comprises a capture service operable for flow control, wherein the capture service comprises a buffer; wherein the target site comprises an apply service operable to embed and analyze the tracking information during a crash recovery sequence; and a monitor service connected to the source site and the target site operable to maintain a state of ongoing replications for status and quality-of-service tracking.

There are several improvements which the invention offers over conventional systems. First, the invention avoids any separate persistent state at the source, target, or the communication channel. This keeps the replication lightweight and inexpensive because an application need not install a DBMS or persistent queue for replicating its data. Avoiding persistence at the source also increases the scalability of the system to multiple targets because the sender need not do additional I/Os for each target. Also, this results in a higher throughput through avoidance of I/O to the persistent queue or change table in the critical path to each receiver.

In the case of relational DBMS or file sources, avoiding source-side persistence is especially useful for improving system efficiency. The DBMS already has a persistent log of changes, and for file system sources the file itself serves as a persistent log. Thus, persisting at the sender will be redundant and wasteful. Therefore, the invention increases overall system efficiency by avoiding source-side persistence. Two ways in which the invention avoids persistence at the source are by embedding the tracking information inside the deltas (δ) at the target, and by using a separate Monitor service to store the progress (timestamp and log read position) of replication at the source.

Another improvement, which the invention offers over conventional systems, is its tolerance for unreliable communication channels. By padding each delta (δ) with a contiguous sequence number, the invention guards against packet drops and re-orderings. This allows the use of an unreliable UDP (user datagram protocol) channel whereas conventional systems require use of a TCP (transmission control protocol) channel. Additionally, the contiguous sequence number also allows the target to apply deltas (δ) out-of-order without losing track of which have and have not been applied. Out-of-order application often arises when the target runs in parallel.

Another advantage of the invention is that the producer and consumer interfaces are generalized to arbitrary data sources, and not just relational DBMSs or files. The invention's scheme even applies to heterogeneous replication, between, for example, a DBMS and a file system, as long as the target understands the deltas (δ) produced by the source. This is a significant improvement over existing replication technologies that are specialized for particular applications like DBMSs or files alone.

BRIEF DESCRIPTION OF THE DRAWINGS

The foregoing will be better understood from the following detailed description of a preferred embodiment(s) of the invention with reference to the drawings, in which.

DETAILED DESCRIPTION OF PREFERRED EMBODIMENTS OF THE INVENTION

Figure 1:
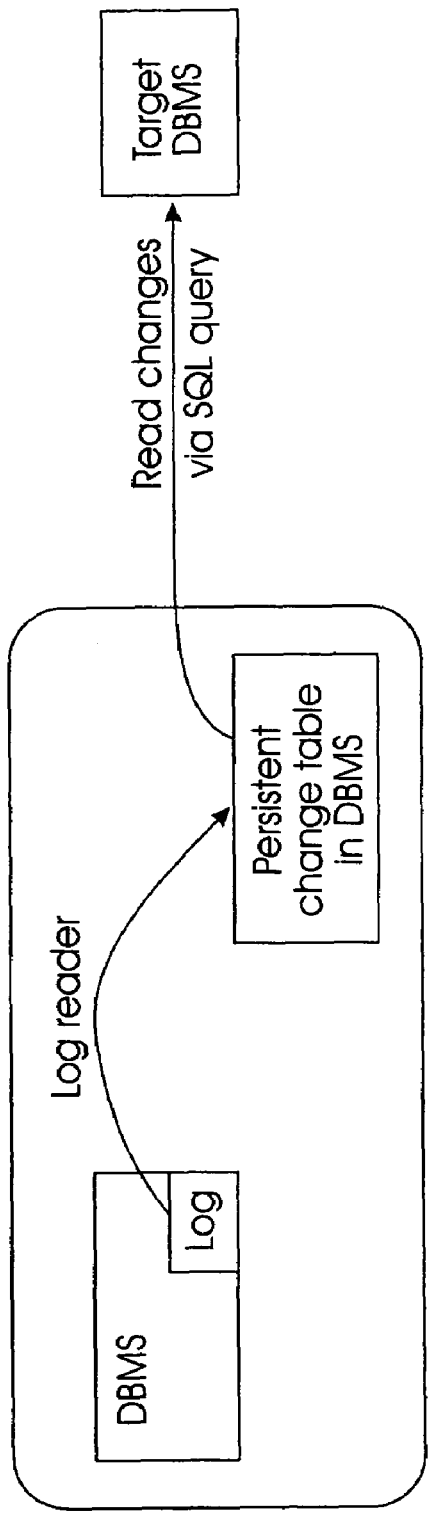
FIG. 1 is a traditional change-table technique for database replication.
Figure 2:
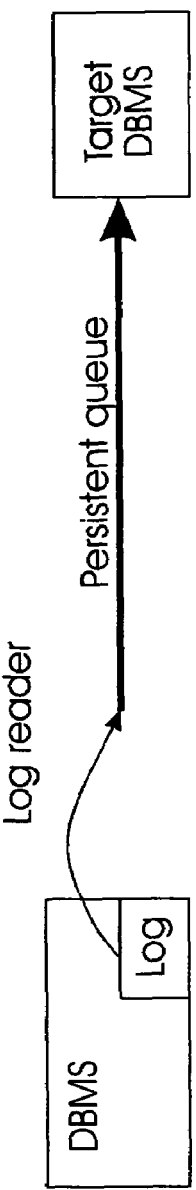
FIG. 2 is a traditional persistent-queue technique for database replication.

Referring now to the drawings, and more particularly to FIGS. 3 through 8, there are shown preferred embodiments of the invention. The invention supports asynchronous replication across a wide variety of data formats, without any persistent change tables at the source 125 or persistent communication channel 115. To keep the data format general, the data source 125 and target 135 are modeled, not as relational databases or file systems, but instead as change (delta or δ) producers and change (delta or δ) consumers. The source 125 produces deltas (δ) that correspond to changes at the source 125, and the target 135 consumes these deltas (δ) to reflect these changes. This definition is broadly applicable to any data format. For example, in a relational DBMS, a delta corresponds to a single transaction: the source 125 produces the delta (δ) by reading its log or through triggers, and the target 135 consumes the delta (δ) by converting the transaction into a DBMS language such as SQL. Likewise, in a reliable file transfer application, the source 125 and target 135 are stored in files. Thus, a delta (δ) can be a part of a file produced by a file-reading program, and appended to the target file by a file-writing program.

Given this definition of a data source 125 and target 135, replication involves propagating deltas (δ) from the source 125 to the target (δ) in a reliable fashion. The reliability issue with replication is as follows: if one of the components in the system (the source 125, the target 135, or the communication channel 115) fails at some point during replication, it needs to be restarted correctly. This means that none of the deltas (δ) should be lost, and none of the deltas (δ) that were applied before the failure should be reapplied. The problem is that of finding exactly which deltas (δ) have already been applied and which have been lost.

Because the invention explicitly avoids the traditional solutions of having persistent change tables at the source 125 or persistent queues in the communication channel 115, the invention uses another manner of tracking this replication progress; viz, which deltas ($\delta$) have already been applied and which have been lost. According to the invention, this tracking information is kept at the target side 135, as part of the target's 135 data storage scheme itself (in a file if the target 135 is a file system, in a table if the target 135 is a DBMS, etc.). Even here, the invention does not use a separate persistent store for the tracking information, which would not only be an extra overhead, but would also require a two-phase commit protocol to synchronize the persistent store with the target 135. Instead, the tracking information is embedded into the delta ($\delta$) records themselves. The target 135, as part of its regular data storage schemes (whether it be a relational DBMS, file system etc.), applies the delta ($\delta$) records, and the replication progress information is piggy-backed in these records itself. The only overhead imposed by the invention's replication service is the tracking information added to each delta ($\delta$) record. This tracking information is small and can be captured in two integers: a timestamp and a sequence number for each delta ($\delta$).

Upon a crash, an apply service 130 at the target 135 reads this tracking information, determines the earliest delta ($\delta$) that needs to be reapplied, and re-subscribes to the source 125 to start sending deltas ($\delta$) from this point forward. The sequence number is a contiguous value, therefore it is used to detect packet drops and re-orderings by the communication channel 115, as well as out-of-order applies by the target 135. Thus, the invention does not require the communication channel 115 to have reliable delivery such as a TCP stream. Instead, a lower overhead UDP (datagram) stream suffices. A crash at the source 125 is treated similarly, whereby all targets 135 will gradually timeout and re-subscribe when the source 125 recovers.

The invention provides optimizations to reduce the overhead of replication. Moreover, the invention uses a run-length encoding scheme at the target 135 to prune the size of the tracking information which needs to be stored. Furthermore, the invention also separates this tracking information into an on-disk non-indexed table and an in-memory index. This separation allows fast searches over the tracking information while still allowing rapid inserts.

Additionally, the invention also allows multiple targets 135 to subscribe simultaneously to the same source. This introduces flow control challenges because the targets 135 may be able to consume deltas ($\delta$) at different speeds, some slower than the source 125 can produce deltas ($\delta$). Therefore, the invention introduces a capture service 120, which buffers the deltas ($\delta$) using a memory buffer 127 at the source 125 and sends them to the targets 135 through independent threads. To ensure that a single slow target 135 does not cause buffer overflows, the capture service 120 also evicts targets 135 that are lagging far behind. These evicted targets 135 can re-subscribe subsequently. This process is analogous to the crash recovery process. In the converse situation where updates are happening at multiple sources 125 and are being replicated to the same target 135, the same delta ($\delta$) could be replicated multiple times. To avoid this, the invention tags the deltas ($\delta$) with origination tags.

Besides the source 125 and the target 135 the invention also introduces a new component termed a monitor service 100. The role of the monitor service 100 is to shepherd multiple concurrent replications by monitoring their progress and initiating crash recovery when needed. The capture and apply services 120, 130, respectively, periodically send heartbeat signals 140 to the monitor service 100 about the latest deltas ($\delta$) they have each processed. By analyzing these deltas ($\delta$) the monitor service 100 infers the progress of replication at the source 125 and the target 135, in terms of the deltas ($\delta$) that have been processed and the latency of replication. In the case of relational DBMS sources 125, the heartbeat 140 also contains the log reader position at the time of the corresponding delta ($\delta$). The monitor service 100 uses this to determine, upon crash recovery, how early in the log to start reading. This optimization enables the source 125 to start reading its log only from the point where deltas ($\delta$) were lost, and substantially reduces crash recovery time.

Figure 3:
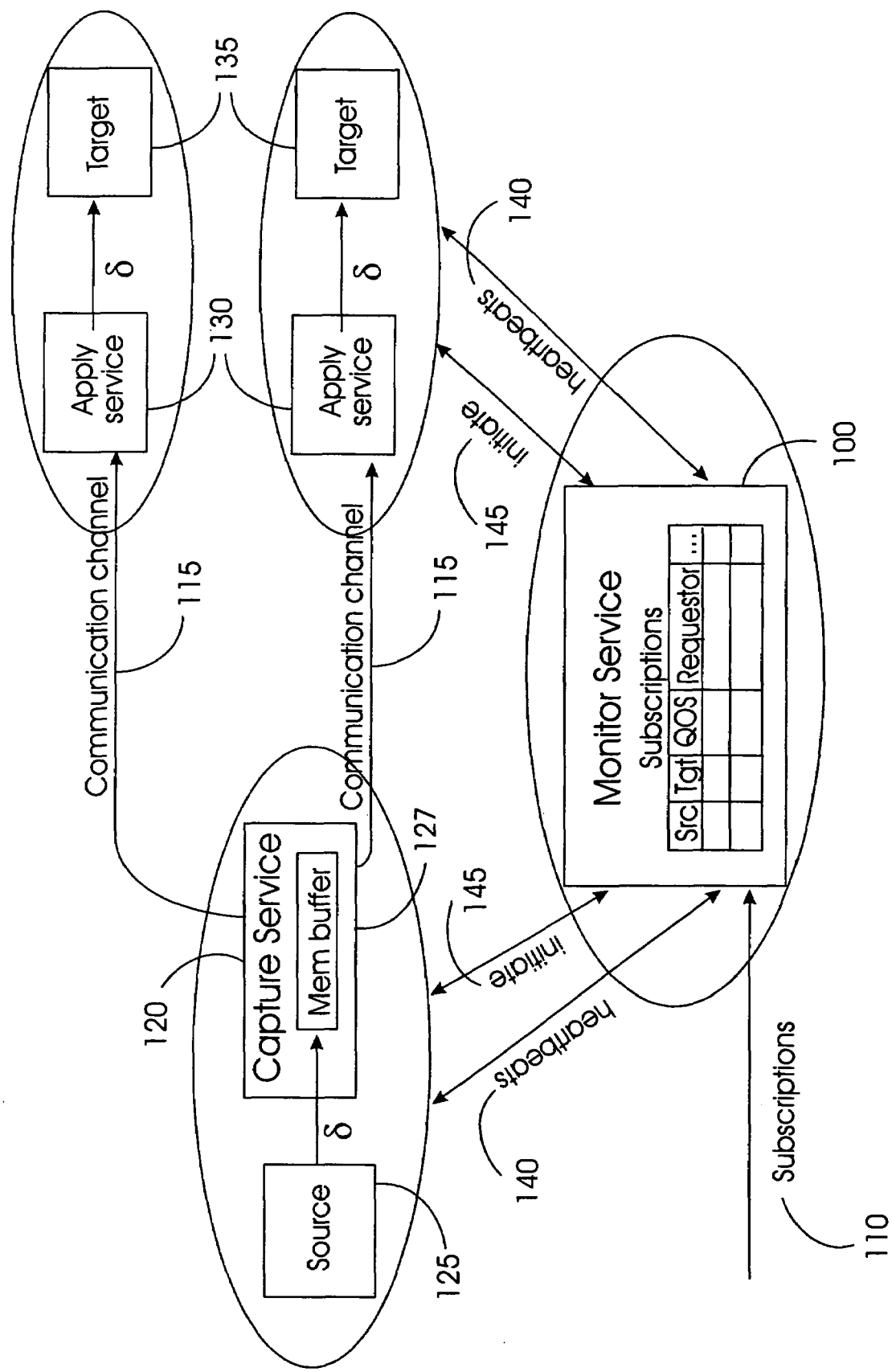
FIG. 3 is a flow diagram illustrating the various components in the system and the dataflow between them according to the invention.

The components of the replication service are illustrated in FIG. 3. The input to invention's replication service is a subscription 110, which is a request for replication between a single source 125 and a single target 135. Subscriptions 110 can be added and removed dynamically, such that at any given time there can be multiple subscriptions to the same source 125 (from different targets 135). These subscriptions 110 could also be dynamically lost when there is a failure at the target 135, source 125, or in the communication channel 115, wherein the target 135 will re-subscribe upon recovery from failure.

A capture service 120 runs at every source 125. The capture service 120 accepts and buffers deltas ($\delta$), using a buffer 127, from the source 125, and is responsible for flow control; i.e., the capture service 120 buffers the deltas ($\delta$) when the targets 135 consume the deltas ($\delta$) more slowly than the source 125 can produce them.

An apply service 130 runs at every target 135, accepting deltas ($\delta$) and handing them to the target 135. The apply service 130 and the target 135 are responsible for tracking the progress of replication; i.e., which deltas ($\delta$) have been applied and which have not. When a subscription 110 is restarted after recovery from a crash, this tracking information is used to find out exactly which deltas ($\delta$) have already been applied, so as to (a) minimize the number of deltas ($\delta$) that the capture service 120 has to re-send, and (b) ensure that each delta ($\delta$) is applied exactly once at the target 135. As mentioned, this tracking information is not kept in a separate persistent store, but is instead stored as part of the target's 135 regular data storage scheme. The statement to insert this tracking information is appended to the delta ($\delta$) itself, so that both delta ($\delta$) and tracking information are written out atomically.

The monitor service 100 is an external component that accepts subscriptions 110 and maintains status information about ongoing subscriptions 110. This includes performance characteristics like the replication progress at the source 125 and target 135, lag between receiving deltas ($\delta$) at the source 125 and applying them at the target 135, etc. This information is stored persistently to ensure correct behavior across monitor service 100 crashes. The monitor service 100 is also used to initiate crash recovery.

Detailed Algorithm for the Capture Service:

The capture service 120 accepts deltas ($\delta$) from the source 125 and sends them to the target 135. Each delta ($\delta$) contains all changes that must be applied atomically (e.g. all changes within a transaction in the case of a DBMS Source). The only requirement on the source 125 is that each delta ($\delta$) must be accompanied by a timestamp that monotonically increases with the time when the delta ($\delta$) was applied. For instance, a relational DBMS can use the LSN (log sequence number) of the commit record of the transaction, and a file system can use the file modification timestamp. In case the timestamps are not contiguous numbers, the capture service 120 also generates a contiguous stream of sequence numbers that it attaches to each delta (δ) so that the target 135 can detect packet drops or re-orderings by the communication channel 115.

Besides sending the deltas (δ) to the target 135, the capture service 120 also periodically sends a heartbeat signal 140 to the monitor service 100. This heartbeat 140 contains the timestamp of the last delta (δ) it has sent to the target 135. The monitor service 100 uses this heartbeat 140 to track the rate at which the replication is making progress at the source 125.

In the case where the source 125 is a relational DBMS, the capture service 120 performs a further optimization to reduce the processing effort upon crash recovery. The invention defines this as the Inflight_LSN, which is the minimum LSN (log sequence number) of transactions still in flight (not yet committed) at the source 125 at any given time. For relational DBMS sources alone, the capture service 120 attaches the Inflight_LSN to the heartbeat signal 140. This Inflight_LSN indicates the position in the log to start reading from in order to return deltas (δ) with timestamps more than the heartbeat's 140 timestamp. Therefore, it is used to reduce the log processing needed during recovery from a crash at the source 125.

The above sequence of operations is formalized in the following function. The monitor service 100 invokes this function on the capture service 120 at subscription initiation 145 and at restart from crash.

monitor service 100 (although it could have sent out as many heartbeats 140 as it wanted). This same situation will be used as a running example to illustrate monitor service 100 and apply service 130 functionality, as well as crash recovery.

Detailed Algorithm for the Apply Service:

As mentioned above, the apply service 130 embeds tracking information into the deltas (δ) to keep track of which deltas (δ) have been applied at the target 135. This tracking information is written by the target 135 as part of its regular data storage scheme. In the case of a relational DBMS, the tracking information can be stored in a separate table. In the case of a file system the tracking information can be stored in a separate file to ensure atomic updates this tracking file must be written to disk before the regular file changes. After a crash, the modification timestamps of the tracking file and the updated file must be compared to check if the delta (δ) was applied or not. In either case, the invention denotes this tracking table/file stored in the target 135 as TrackingInfo. In DBMSs, checking a table like TrackingInfo to see if a delta (δ) has been applied can be expensive unless it is indexed. However, an index will slow down the inserts of tracking information. In order to avoid this problem, the apply service 130 provided by the invention loads a version of TrackingInfo into memory at subscription initiation and crash recovery. The invention terms this in MemTrackingInfo. The only difference between TrackingInfo and in MemTrackingInfo is that upon a crash in MemTrackingInfo is lost and needs to be rebuilt from TrackingInfo. TrackingInfo contains one entry <seqNum,timestamp> for each delta

```
/** Start sending deltas on given communicationChannel that have timestamps > minTimestamp.
    Append a sequence number to each delta, starting at startSeqNum. In the case of relational
    DBMS sources, startLSN is a pointer in the log for the Source to start reading from (i.e., the
    Monitor service guarantees that relevant deltas all have timestamps > startLSN).
    When this function is called to initiate a new subscription,
    minTimestamp=startSeqNum=startLSN=0
    When this function is called on crash recovery, minTimestamp, startSeqNum, startLSN are
    specified according to the tracking information at the Target - this process is described as
    part of Monitor service functionality **/
void subscribe(communicationChannel, minTimestamp, startSeqNum,
startLSN)
{
    1.  Ask Source to start sending δs. As an optimization, tell Source that it need only start
        resending deltas with timestamps > minTimestamp. Furthermore, if the Source is a
        relational DBMS, tell the Source that all these deltas will be found in its log after
        position startLSN only.
    2.  seqNum = startSeqNum;
    3.  for each δ do steps 4 through 7 //loop forever
    4.      if (δ.timestamp ≤ minTimestamp) continue;
    5.      Append seqNum to δ;
    6.      seqNum + +;
    7.      Send δ on the communicationChannel.
    8.  Periodically (in a separate thread), send a heartbeat with the latest δ.timestamp and
        Inflight_LSN to the Monitor service. This is an optional optimization, so it is fine to do
        this infrequently.
}
```

Figure 4:
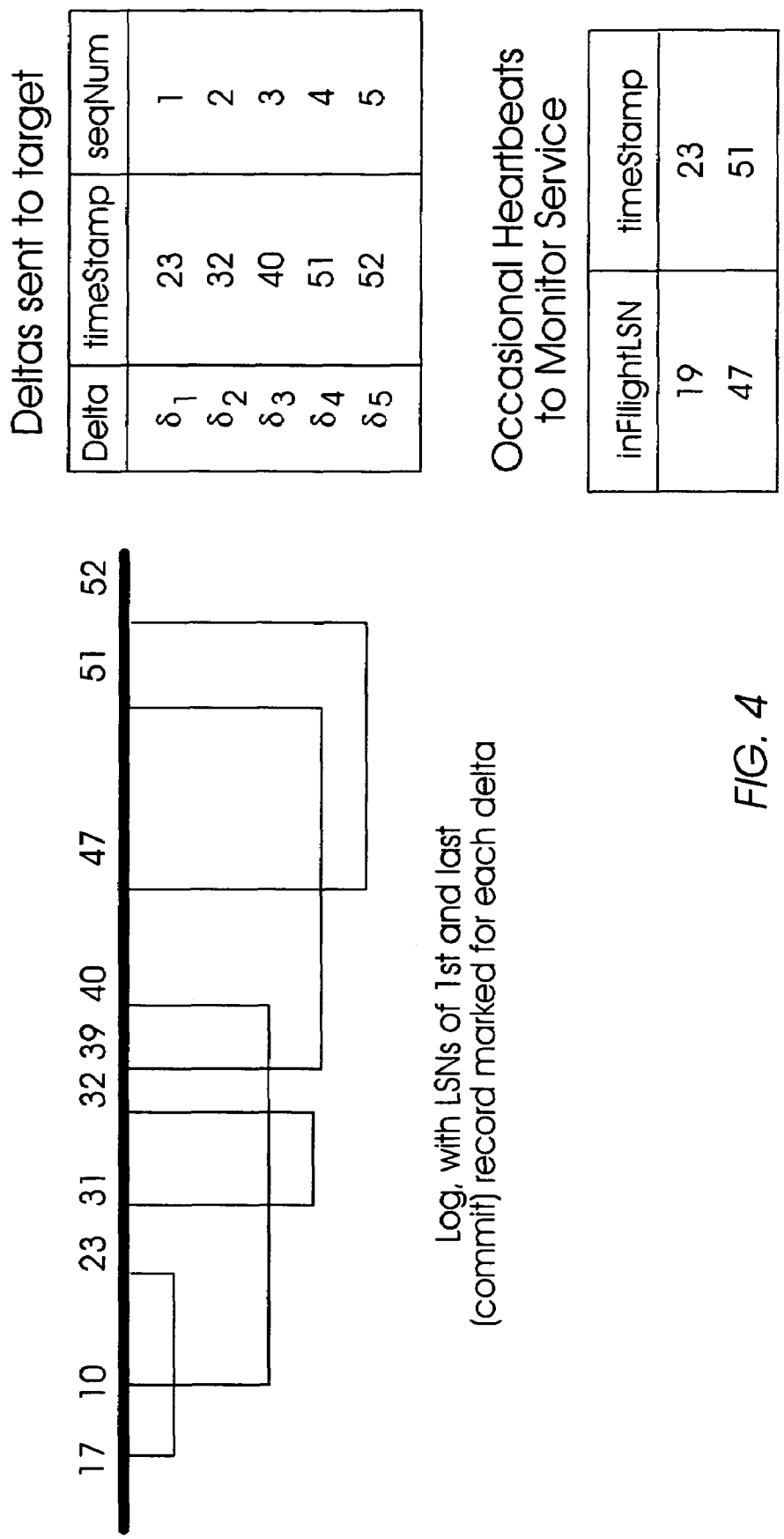
FIG. 4 is a diagram illustrating an example of source side behavior according to the invention.

FIG. 4 illustrates an example of the capture service algorithm using five transactions and the corresponding deltas sent by the capture service 120. In this example, the capture service 120 sends out only two heartbeats 140 to the (δ) that has been applied (these entries can be pruned significantly as shown below). The timestamp is the timestamp of the applied delta (δ), and is used to identify whether a given delta (δ) has already been applied to the target 135.

The seqNum is the sequence number assigned for the delta (δ) by the capture service 120. The seqNum is used for pruning, and to detect loss or reordering of deltas (δ) by the communication channel 115.

The invention also formalizes the functioning of the apply service 130. The monitor service 100 invokes the following function on the apply service 130 at subscription initiation 145 and restart from crash:

```
void subscribe(communicationChannel, TrackingInfo)
{
    1.  Read TrackingInfo from disk into an inMemTrackingInfo.
    2.  Periodically call prune ( ) to reduce size of TrackingInfo and inMemTrackingInfo.
    3.  Periodically send a heartbeat containing min(inMemTrackingInfo.timestamp) to Monitor
        service. So the Monitor knows that all transactions up to this timestamp have been
        applied at the Target.
    4.  for each δ arriving on communicationChannel do steps a through f
        a.  /* delta already applied, and entry is in transaction table */
            if (δ.timestamp ∈ inMemTrackingInfo.timestamp) continue;
        b.  /* delta already applied, but corresponding entry has been pruned */
            if (δ.timestamp ≦ min(inMemTrackingInfo.timestamp)) continue;
        c.  /* communicationChannel has dropped or reordered a delta */
            if (δ.seqNum > 1 + inMemTrackingInfo.maxContigSeqNum) {
                Ask communicationChannel to clean up, and ask the Capture Service to start
                resending deltas from 1 + inMemTrackingInfo.maxContigSeqNum;
                continue;
            }
        d.  Insert < δ.seqNum, δ.timestamp > into inMemTrackingInfo
        e.  Embed into the delta a statement to insert <δ.seqNum, δ.timestamp > into
            TrackingInfo. E.g. if the Target is a SQL DBMS, embed "INSERT into TrackingInfo
            VALUES {δ.seqNum,δ.timestamp}"
        f.  Send δ to the Target.
}
/*** Prune inMemTrackingInfo and TrackingInfo of rows corresponding to most deltas that have
    been applied by the Target. Only the rows corresponding to unapplied deltas and to deltas
    that were applied out-of-order (due to parallelism in applying at the Target) are retained.
    Effectively, the following invariants are maintained:
        ■ All transactions with timestamp ≦ min(inMemTrackingInfo.timestamp) have been
            applied.
        ■ All transactions with timestamp ∈ TrackingInfo.timestamp have been applied.
    Thus after pruning, the number of rows in these tables is at most the concurrency level of the
Target.
***/
void prune ( )
{
    1.  minSN = min(TrackingInfo.seqNum);
    2.  /* Compute the earliest sequence number among the unapplied deltas */
        Let minUnAppliedSeqNum be the lowest number such that minSN <
        minUnAppliedSeqNum and minUnAppliedSeqNum ∈TrackingInfo.seqNum.
    3.  Delete from TrackingInfo and inMemTrackingInfo all rows with seqNum <
            minUnAppliedSeqNum − 1.
}
```

The invention also provides for a Max Contiguous Sequence Number, which is defined by: Let minSN=min(inMemTrackingInfo.seqNum). Then, maxContigSeqNum is defined as the highest sequence number such that {minSN, minSN+1, minSN+2, . . . ,maxContigSeqNum} ⊆ inMemTrackingInfo.seqNum. The semantics of maxContigSeqNum is that it is the highest sequence number received from the source 125 since the last crash at the target 135. Therefore, if the sequence number of a new delta (δ) is greater than maxContigSeqNum+1, it must have been either dropped or delivered out-of-order by the communication channel 115.

Figure 5:
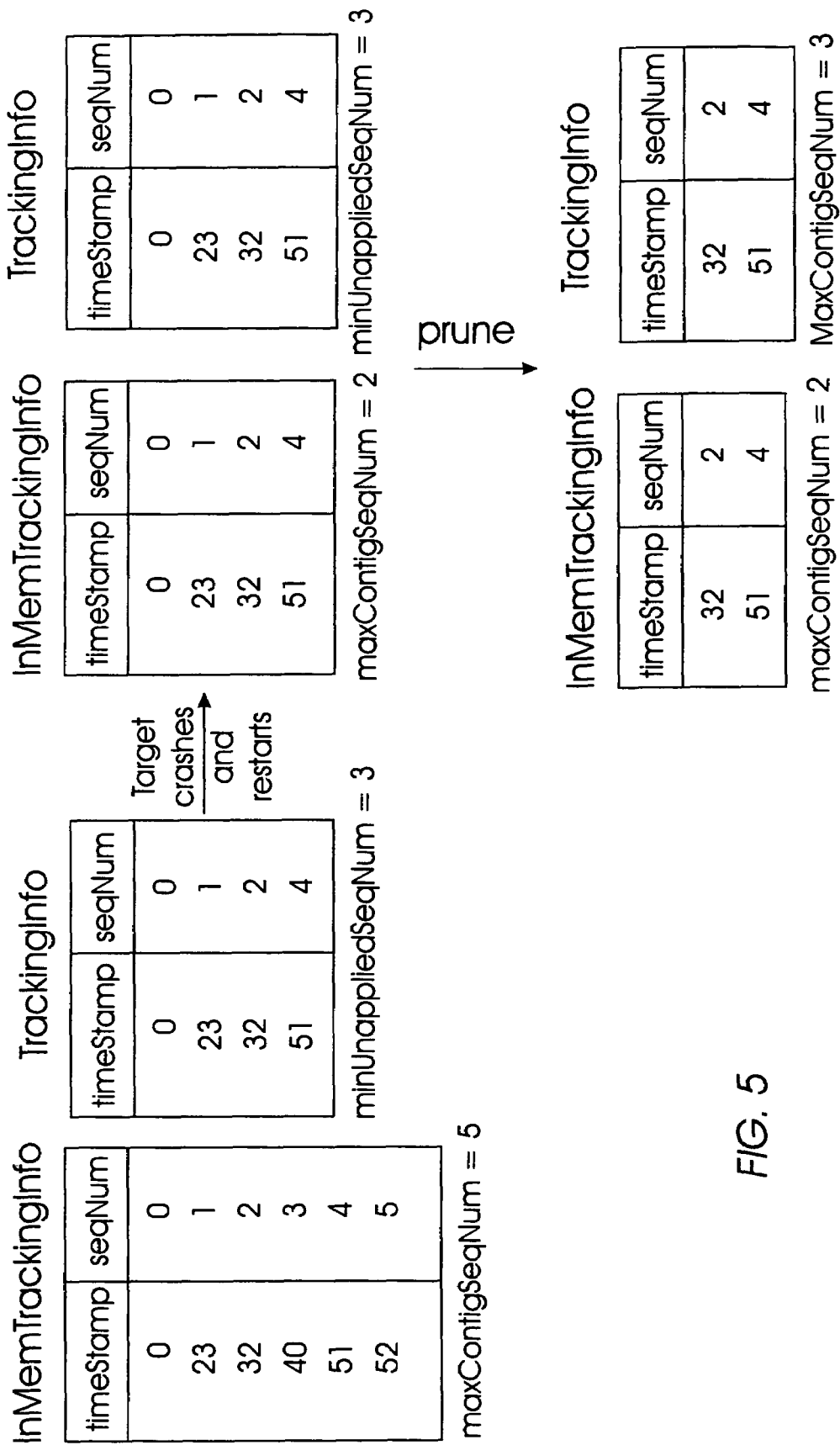
FIG. 5 is a diagram illustrating target side behavior and crash recovery for the example of FIG. 4 according to the invention.

FIG. 5 illustrates an example of the apply service algorithm for the situation corresponding to FIG. 4. The apply service 130 gets five deltas (δ) from the source 125, but crashes as soon as three deltas (δ) are applied. The applied deltas (δ) are tracked in TrackingInfo and loaded into inMemTrackingInfo after the crash. Then, the applied deltas (δ) are pruned.

Detailed Algorithm for the Monitor Service:

When the monitor service 100 receives a new subscription 110 request, it performs the following routine to initiate 145 the subscription 110 at the source 125 and target 135.

```
void subscribe(Source, Target)
{
    1.  Enter details of subscription into local persistent subscription table.
    2.  Initiate Capture service and Apply service at the Source and Target (respectively) if
        needed.
    3.  Create TrackingInfo at Target, initialized with a single row < 0,0 >. This signifies the
        beginning of replication.
    4.  Setup channel between Capture and Apply service. This need not be a persistent channel,
        and reliable delivery can be a best-effort guarantee (like TCP or even UDP).
    5.  ApplyService.subscribe(channel,TrackingInfo);
    6.  CaptureService.subscribe(channel,0,1,0);
}
```

After the subscription 10 has been initiated 145 as described above, the monitor service 100 tracks its status and progress. Thus, the monitor service 100 maintains a table ProgressInfo to track the progress of the replication. Each entry in the ProgressInfo is a pair <in FlightLSN, timestamp>, with the semantics described under the capture service algorithm: the source 125 has sent a delta (δ) to the target 135 with a timestamp of timestamp, and in FlightLSN (optional; only for relational DBMS sources) is the earliest log record of all transactions that are still in flight at that point. The timestamp is used to gauge the replication progress at the source 125, and the in FlightLSN is used to minimize log reads on crash recovery.

130, lastSeqNum and lastTimestamp are derived as 2 and 32 respectively. The startLSN is calculated as 19 (from the ProgressInfo entries) and passed to the capture service 120 as the point from where to start reading the log. This recovery method will work even if the capture service 120 had also crashed simultaneously.

Further Optimization:

On a crash, the entire TrackingInfo.timestamp could be sent to capture service 120 rather than only lastTimestamp. This allows the capture service 120 to know exactly which deltas (δ) have been applied at the target 135, thereby avoiding resending of even a single delta (δ).

```
void handleHeartBeat( )
{
    1.  for each heartbeat from Capture service do // loop forever
        ■  If heartbeat times out, call handleCrash(Source, Target);
        ■  Append <heartbeat.inFlightLSN, heartbeat.timestamp> to ProgressInfo
    2.  for each heartbeat from Apply service do // loop forever
        ■  If heartbeat times out, call handleCrash(Source, Target);
        ■  /* Prune the ProgressInfo table*/
           floorTS = max(ProgressInfo.timestamp|floorTS <= heartbeat.timestamp);
           Remove all rows with timestamp < floorTS;
}
```

When a crash occurs the following steps are taken

```
void handleCrash(Source, Target)
{
    1.  Restart the Apply service if it crashed.
    2.  Restart the Capture service if it crashed.
    3.  Setup communicationChannel between Capture and Apply
        service.
    4.  ApplyService.subscribe(communicationChannel, TrackingInfo);
    5.  /* Find the point up to which deltas have been applied at
        the Target */
        lastSeqNum = min (ApplyService.inMemTrackingInfo.seqNum);
        lastTimestamp =
        min(ApplyService.inMemTrackingInfo.timestamp);
    6.  /* Subscribe from that point onwards */
        floorTS = max(ProgressInfo.timestamp such that floorTS ≦
        lastTimestamp);
        startLSN = the inFlightLSN corresponding to floorTS in
        ProgressInfo;
        CaptureService.subscribe(channel,lastTimestamp,lastSeqNum+1,
        startLSN);
}
```

In the example illustrated in FIGS. 4 and 5, the ProgressInfo table has two rows: {<19, 23> and <47, 51>} at the time of the target side 135 crash. After restarting the apply service Replication to Multiple Targets:

When multiple targets 135 are subscribing to the same source 125, each subscription 110 is associated with a separate subscription thread in the capture service 120. The capture service 120 takes deltas (δ) from the source 125 and places them into the capture buffer 127. Then each subscription thread continually reads deltas (δ) from this buffer 127, assigns a sequence number, and then sends them to the appropriate Targets 135. Periodically, the capture service 120 flushes from this buffer 127 deltas (δ) that have been handled by all subscription threads.

The monitor service's 100 crash recovery role changes slightly however. It chooses the startLSN to be the minimum of the startLSNs required for each subscribing target 135. If the delta (δ) for this LSN happens to still remain in the capture buffer 127 (because the capture service 120 may not have crashed), then the log reader is not affected at all. Otherwise, the log reader must start reading from this startLSN.

In widely distributed settings, some targets 135 may be significantly slower than others and may even have intermittent connectivity to the source 125. However, it is preferable that the capture buffer 127 does not grow arbitrarily large holding deltas (δ) for slow subscriptions 110.

Therefore, the capture service 120 periodically "kicks out" subscriptions 110 that are lagging too far behind. Then, when the target 135 comes back, it re-subscribes. At this point, the capture service 120 could either get the missing deltas (δ) from the database log or do a full backup to bring the target 135 up-to-date.

Figure 6:
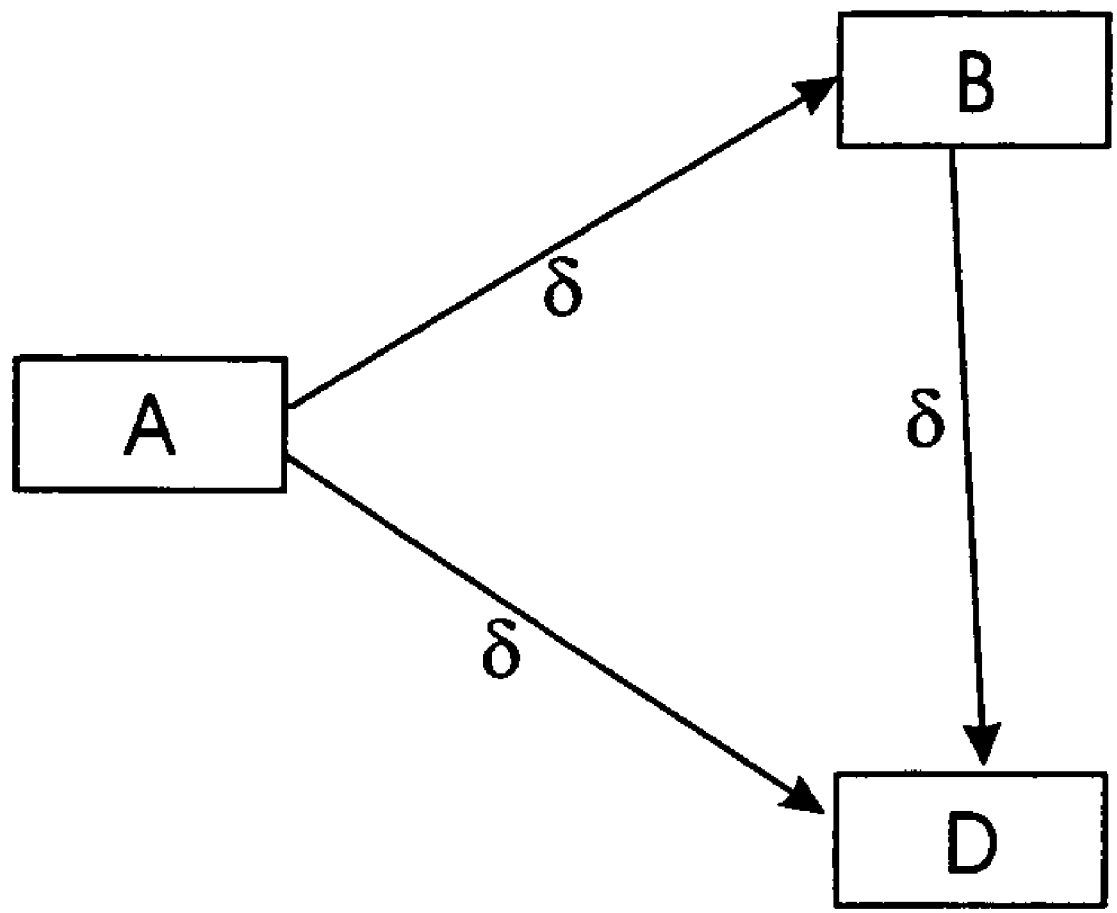
FIG. 6 is a schematic diagram illustrating a situation where data is updated at multiple places and replicated to the same target.

Avoiding Duplicates in Multi-Source Update Scenarios:

When multiple sources 125 are replicating to the same target 135, all conflict resolutions are performed within the target 135. However, deltas (δ) could be duplicated within the replication dataflow, which need to be removed explicitly. For example, FIG. 6 illustrates an example of replication with updates at multiple sources A, B, D. Specifically, in FIG. 6, replication is set up from A to B, B to D, and A to D. Therefore, an update at A will arrive at D twice, once directly and once via B. To avoid such duplicates each delta (δ) is tagged with its birthplace, which is the source 125 from where it originates, and its timestamp at this birthplace. Thereafter, when the apply service 130 receives a delta (δ) it checks these two against its transaction table.

Figure 7:
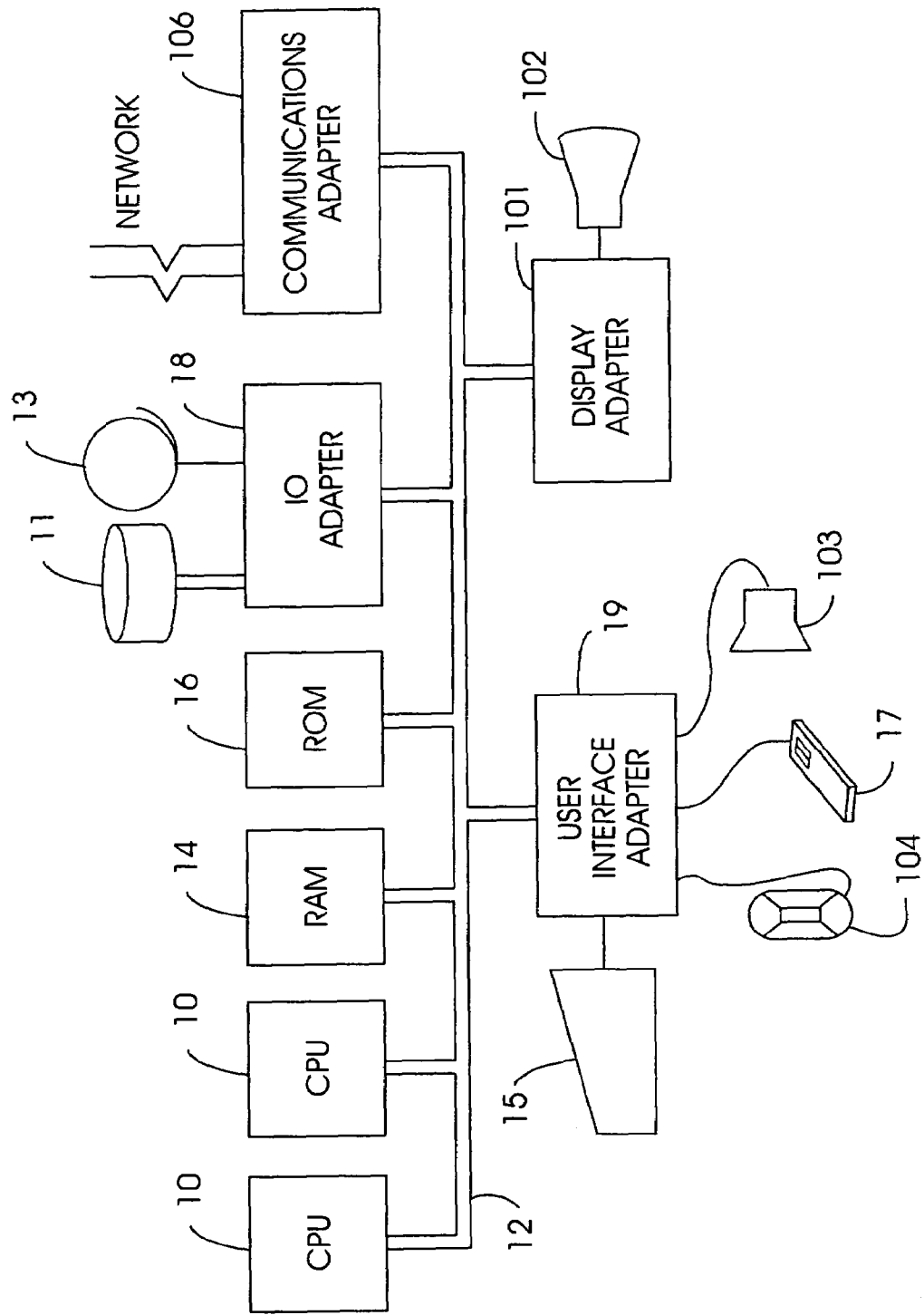
FIG. 7 is a system diagram according to the invention.

A representative hardware environment for practicing the present invention is depicted in FIG. 7, which illustrates a typical hardware configuration of an information handling/computer system 1 in accordance with the invention, having at least one processor or central processing unit (CPU) 10. The CPUs 10 are interconnected via system bus 12 to random access memory (RAM) 14, read-only memory (ROM) 16, an input/output (I/O) adapter 18 for connecting peripheral devices, such as disk units 11 and tape drives 13, to bus 12, user interface adapter 19 for connecting keyboard 15, mouse 17, speaker 103, microphone 104, and/or other user interface devices such as a touch screen device (not shown) to bus 12, communication adapter 106 for connecting the information handling system to a data processing network, and display adapter 101 for connecting bus 12 to display device 102. A program storage device readable by the disk or tape units is used to load the instructions, which operate the invention, which is loaded onto the computer system 1.

Figure 8:
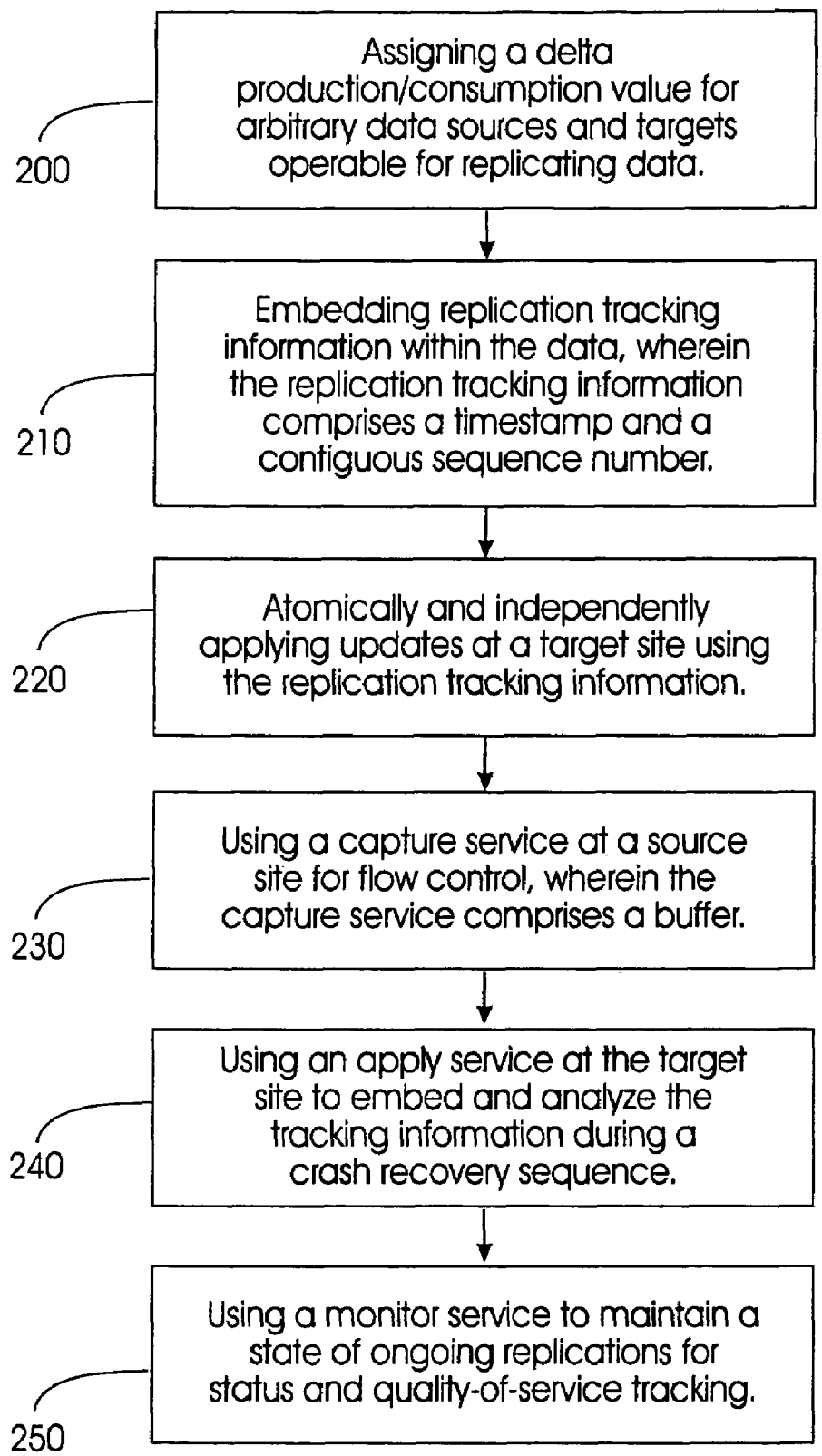
FIG. 8 is a flow diagram illustrating a preferred method of the invention.

According to one embodiment of the invention, a method of data replication in a distributed computing system is illustrated in the flow diagram shown in FIG. 8. The method comprises assigning 200 a delta production/consumption value for arbitrary data sources and targets operable for replicating data. Next, the process involves embedding 210 replication tracking information within the data, wherein the replication tracking information comprises a timestamp and a contiguous sequence number. Thereafter, the method includes atomically and independently applying 220 updates at a target site 135 using the replication tracking information. The next step of the process provides using 230 a capture service 120 at a source site 125 for flow control, wherein the capture service 120 comprises a buffer 127. Upon completion of this step, the process then involves using 240 an apply service 130 at the target site 135 to embed and analyze the tracking information during a crash recovery sequence. Finally, the process includes using 250 a monitor service 100 to maintain a state of ongoing replications for status and quality-of-service tracking.

The method further comprises allowing data sources and targets of arbitrary data formats, including relational DBMSs, files, query results, XML DBMSs to be replicated, through an abstraction of delta (change) production/consumption, and a monotonically increasing timestamp on each delta (δ). The replication tracking information is used to determine if a given delta (δ) has been previously applied to the target site 135. Moreover, in the event of a crash in the system, the target site 135 requests retransmission of replicated data from the source site 125 beginning at a given timestamp and sequence number. The sequence number and timestamp are operable to determine if any transaction has been lost during transmission from the source site 125 to the target site 135, wherein the sequence number is a contiguous series of numbers increasing from 1 to n and the timestamp is any monotonically increasing sequence of numbers.

Furthermore, according to the method of the invention, the target site 135 is operable to apply deltas (δ) autonomously and independently from the source site 125. Also, the capture and apply services 120, 130, respectively, send periodic signals 140 to the monitor service 100 to track a progression of replication for answering status and quality of service queries. The capture service 120 selectively removes replication requests, which lag other requests by more than a predetermined permissible amount. Additionally, the replicated data further comprises origination tags, wherein the origination tags are operable to prevent duplicate replications of a same data from occurring at the target site 135 via different routes.

Moreover, the apply service 130 utilizes run-length encoding to compactly describe an interval of timestamps and sequence numbers, wherein the apply service 130 utilizes an in-memory index when a system crash occurs and a recovery process is initiated by the system. The target site 135 autonomously tracks a progression of replication of the data by maintaining a separate table of applied deltas (δ), wherein the separate table comprises an entry, wherein each entry in the table comprises the timestamp and the sequence number of a delta (δ), wherein the sequence number is operable to determine if a transaction has been misplaced in the system. A file-based target site 135 can maintain the table in a separate file and perform atomic updates by writing the file to a disk before updated files are written to the disk.

There are several improvements which the invention offers over conventional systems. First, the invention avoids any separate persistent state at the source 125, target 135, or the communication channel 115. This keeps the replication light-weight and inexpensive because an application need not install a DBMS or persistent queue for replicating its data. Avoiding persistence at the source 125 also increases the scalability of the system to multiple targets 135 because the sender need not do additional I/Os for each target 135. Also, this results in a higher throughput through avoidance of I/O to the persistent queue or change table in the critical path to each receiver.

In the case of relational DBMS or file sources, avoiding source-side persistence is especially useful for improving system efficiency. The DBMS already has a persistent log of changes, and for file system sources the file itself serves as a persistent log. Thus, persisting at the sender will be redundant and wasteful. Therefore, the invention increases overall system efficiency by avoiding source-side persistence. Two ways in which the invention avoids persistence at the source are by embedding the tracking information inside the deltas (δ) at the target 135, and by using a separate monitor service 100 to store the progress (timestamp and log read position) of replication at the source 125.

Another improvement which the invention offers over conventional systems is its tolerance for unreliable communication channels 115. By padding each delta (δ) with a contiguous sequence number, the invention guards against packet drops and re-orderings. This allows the use of an unreliable UDP (user datagram protocol) channel whereas conventional systems require use of a TCP (transmission control protocol) channel. Additionally, the contiguous sequence number also allows the target 135 to apply deltas (δ) out-of-order without losing track of which have and have not been applied. Out-of-order application often arises when the target 135 runs in parallel.

Another advantage of the invention is that the producer and consumer interfaces are generalized to arbitrary data sources 125, and not just relational DBMSs or files. The invention's scheme even applies to heterogeneous replication, between, for example, a DBMS and a file system, as long as the target 135 understands the deltas (δ) produced by the source 125. This is a significant improvement over existing replication technologies that are specialized for particular applications like DBMSs or files alone.

While the invention has been described in terms of preferred embodiments, those skilled in the art will recognize that the invention can be practiced with modification within the spirit and scope of the appended claims.

What is claimed is:

1. A method of data replication in a distributed computing system, said method comprising:
    assigning a delta production and consumption value for arbitrary data sources and targets operable for replicating data, wherein each delta production and consumption value contains all changes that must be applied atomically to data being replicated in said distributed computing system;
    embedding replication tracking information within said delta production and consumption value, wherein said replication tracking information comprises a timestamp and a contiguous sequence number;
    sending the embedded delta production and consumption value from a source site to a target site;
    atomically and independently applying updates exactly once at said target site using said replication tracking information; and
    using an apply service at said target site to embed and analyze said tracking information during a crash recovery sequence, wherein said apply service utilizes an in-memory index when a system crash occurs and a recovery process is initiated by said distributed computing system.

2. The method of claim 1, further comprising using a capture service at a source site for flow control, wherein said capture service comprises a buffer.

3. The method of claim 2, wherein said capture service is adapted to prevent resending of an already sent delta production and consumption value from a source site to said target site.

4. The method of claim 1, further comprising using a monitor service to maintain a state of ongoing replications for status and quality-of-service tracking.

5. The method of claim 1, further comprising allowing data sources and targets of arbitrary data formats, including relational DBMSs, files, query results, XML DBMSs to be replicated, through an abstraction of delta production and consumption, and a monotonically increasing timestamp on each said delta.

6. The method of claim 1, wherein said replication tracking information is used to determine if a given delta has been previously applied to said target site.

7. The method of claim 1, wherein in an event of a crash in said system, said target site requests retransmission of replicated data from said source site beginning at a given timestamp and sequence number.

8. The method of claim 1, wherein said sequence number and timestamp are operable to determine if any transaction has been lost during transmission from said source site to said target site, wherein said sequence number is a contiguous series of numbers increasing from 1 to n and said timestamp is any monotonically increasing sequence of numbers.

9. The method of claim 1, wherein said target site is operable to apply deltas autonomously and independently from said source site.

10. The method of claim 2, wherein said capture and apply services send periodic signals to said monitor service to track a progression of replication for answering status and quality of service queries.

11. The method of claim 2, wherein said capture service selectively removes replication requests which lag other requests by more than a predetermined permissible amount.

12. The method of claim 1, wherein said replicated data further comprises origination tags, wherein said origination tags are operable to prevent duplicate replications of a same data from occurring at said target site via different routes.

13. The method of claim 1, wherein said apply service utilizes run-length encoding to compactly describe an interval of timestamps and sequence numbers.

14. The method of claim 2, wherein communication between said capture service and said apply service occurs over an unreliable user datagram protocol (UDP) communication channel.

15. The method of claim 1, wherein said target site autonomously tracks a progression of replication of said data by maintaining a separate table of applied deltas.

16. The method of claim 15, wherein said separate table comprises an entry, wherein each entry in said table comprises said timestamp and said sequence number of a delta, and wherein said sequence number is operable to determine if a transaction has been misplaced in said distributed computing system.

17. The method of claim 15, wherein a file-based target site can maintain said table in a separate file and perform atomic updates by writing said file to a disk before updated files are written to said disk.

18. A program storage device readable by computer, tangibly embodying a program of instructions executable by said computer to perform data replication in a distributed computing system, said program comprising:
    assigning a delta production and consumption value for arbitrary data sources and targets operable for replicating data, wherein each delta production and consumption value contains all changes that must be applied atomically to data being replicated in said distributed computing system;
    embedding replication tracking information within said delta production and consumption value, wherein said replication tracking information comprises a timestamp and a contiguous sequence number;
    sending the embedded delta production and consumption value from a source site to a target site;
    atomically and independently applying updates exactly once at said target site using said replication tracking information; and
    using an apply service at said target site to embed and analyze said tracking information during a crash recovery sequence, wherein said apply service utilizes an in-memory index when a system crash occurs and a recovery process is initiated by said distributed computing system.

19. The program storage device of claim 18, further comprising using a capture service at a source site for flow control, wherein said capture service comprises a buffer.

20. The program storage device of claim 19, wherein said capture service is adapted to prevent resending of an already sent delta production and consumption value from a source site to said target site.

21. The program storage device of claim 18, further comprising using a monitor service to maintain a state of ongoing replications for status and quality-of-service tracking.

22. The program storage device of claim 18, further comprising allowing data sources and targets of arbitrary data formats, including relational DBMSs, files, query results, XML DBMSs to be replicated, through an abstraction of delta production and consumption, and a monotonically increasing timestamp on each said delta.

23. The program storage device of claim 18, wherein said replication tracking information is used to determine if a given delta has been previously applied to said target site.

24. The program storage device of claim 18, wherein in an event of a crash in said system, said target site requests retransmission of replicated data from said source site beginning at a given timestamp and sequence number.

25. The program storage device of claim 18, wherein said sequence number and timestamp are operable to determine if any transaction has been lost during transmission from said source site to said target site, wherein said sequence number is a contiguous series of numbers increasing from 1 to n and said timestamp is any monotonically increasing sequence of numbers.

26. The program storage device of claim 18, wherein said target site is operable to apply deltas autonomously and independently from said source site.

27. The program storage device of claim 19, wherein capture and apply services send periodic signals to said monitor service to track a progression of replication for answering status and quality of service queries.

28. The program storage device of claim 19, wherein said capture service selectively removes replication requests which lag other requests by more than a predetermined permissible amount.

29. The program storage device of claim 18, wherein said replicated data further comprises origination tags, wherein said origination tags are operable to prevent duplicate replications of a same data from occurring at said target site via different routes.

30. The program storage device of claim 18, wherein said apply service utilizes run-length encoding to compactly describe an interval of timestamps and sequence numbers.

31. The program storage device of claim 19, wherein communication between said capture service and said apply service occurs over an unreliable user datagram protocol (UDP) communication channel.

32. The program storage device of claim 18, wherein said target site autonomously tracks a progression of replication of said data by maintaining a separate table of applied deltas.

33. The program storage device of claim 32, wherein said separate table comprises an entry, wherein each entry in said table comprises said timestamp and said sequence number of a delta, and wherein said sequence number is operable to determine if a transaction has been misplaced in said distributed computing system.

34. The program storage device of claim 32, wherein a file-based target site can maintain said table in a separate file and perform atomic updates by writing said file to a disk before updated files are written to said disk.

35. A data replication system comprising:
a source site comprising data to be replicated, wherein updates to said data to be replicated are represented by a computer hardware readable delta production and consumption value, wherein each delta production and consumption value contains all changes that must be applied atomically to data being replicated in said data replication system, and wherein said delta production and consumption value is embedded with replication tracking information, said replication tracking information comprising a timestamp and a contiguous sequence number;
a target site connected by a communication channel to said source site, wherein said target site comprises a computer processor operable to receive updates exactly once using said replication tracking information, wherein said target site comprises a computer hardware readable apply service operable to embed and analyze said tracking information during a crash recovery sequence, and wherein said apply service utilizes an in-memory index when a system crash occurs and a recovery process is initiated by said data replication system; and
a delta production and consumption interface in communication with arbitrary data sources and targets.

36. The system of claim 35, wherein said source site comprises a capture service operable for flow control, wherein said capture service comprises a buffer.

37. The system of claim 36, wherein said capture service is adapted to prevent resending of an already sent delta production and consumption value from a source site to said target site.

38. The system of claim 35, further comprising a monitor service connected to said source site and said target site operable to maintain a state of ongoing replications for status and quality-of-service tracking.

39. The system of claim 35, further comprising allowing data sources and targets of arbitrary data formats, including relational DBMSs, files, query results, XML DBMSs to be replicated, through an abstraction of delta production and consumption, and a monotonically increasing timestamp on each said delta.

40. The system of claim 35, wherein said replication tracking information is used to determine if a given delta has been previously applied to said target site.

41. The system of claim 35, wherein in an event of a crash in said system, said target site requests retransmission of replicated data from said source site beginning at a given timestamp and sequence number.

42. The system of claim 35, wherein said sequence number and timestamp are operable to determine if any transaction has been lost during transmission from said source site to said target site, wherein said sequence number is a contiguous series of numbers increasing from 1 to n and said timestamp is any monotonically increasing sequence of numbers.

43. The system of claim 35, wherein said target site is operable to apply deltas autonomously and independently from said source site.

44. The system of claim 36, wherein said capture and apply services send periodic signals to said monitor service to track a progression of replication for answering status and quality of service queries.

45. The system of claim 36, wherein said capture service selectively removes replication requests which lag other requests by more than a predetermined permissible amount.

46. The system of claim 35, wherein said replicated data further comprises origination tags, wherein said origination tags are operable to prevent duplicate replications of a same data from occurring at said target site via different routes.

47. The system of claim 35, wherein said apply service utilizes run-length encoding to compactly describe an interval of timestamps and sequence numbers.

48. The system of claim 36, wherein said communication channel comprises an unreliable user datagram protocol (UDP) communication channel.

49. The system of claim 35, wherein said target site autonomously tracks a progression of replication of said data by maintaining a separate table of applied deltas.

50. The system of claim 49, wherein said separate table comprises an entry, wherein each entry in said table comprises said timestamp and said sequence number of a delta, wherein said sequence number is operable to determine if a transaction has been misplaced in said system.

51. The system of claim 49, wherein a file-based target site can maintain said table in a separate file and perform atomic updates by writing said file to a disk before updated files are written to said disk.

52. A distributed computer-implemented data replication system comprising:
- means for assigning a delta production and consumption value for arbitrary data sources and targets operable for replicating data, wherein each delta production and consumption value contains all changes that must be applied atomically to data being replicated in said data replication system;
- means for embedding replication tracking information within said delta production and consumption value, wherein said replication tracking information comprises origination tags, a timestamp, and a contiguous sequence number;
- means for sending the embedded delta production and consumption value from a source site to a target site;
- means for atomically and independently applying updates exactly once at said target site using said replication tracking information; and
- means for using an apply service at said target site to embed and analyze said tracking information during a crash recovery sequence, wherein said apply service utilizes an in-memory index when a system crash occurs and a recovery process is initiated by said data replication system.

* * * * *